United States Patent [19]

Guyot et al.

[11] Patent Number: 4,469,973
[45] Date of Patent: Sep. 4, 1984

[54] RESILIENTLY SUSPENDED STATOR FOR A DYNAMO-ELECTRICAL SYNCHRONOUS MACHINE

[75] Inventors: Jean Guyot, Fontaine; Jean-Michel Guillard; Germain Bauchet, both of Belfort, all of France

[73] Assignee: Alsthom-Atlantique, Paris, France

[21] Appl. No.: 467,044

[22] Filed: Feb. 16, 1983

[30] Foreign Application Priority Data

Feb. 18, 1982 [FR] France .................... 82 02675

[51] Int. Cl.³ ..................... H02K 1/18; H02K 15/14
[52] U.S. Cl. ................................. 310/258; 310/51; 310/91
[58] Field of Search .............. 310/51, 254, 258, 259, 310/42, 91, 216-218

[56] References Cited

U.S. PATENT DOCUMENTS

| | | | |
|---|---|---|---|
| 2,424,299 | 7/1947 | Baudry et al. | |
| 2,489,109 | 11/1949 | Shildneck. | |
| 2,973,442 | 2/1961 | Wilson | 310/258 |
| 3,988,622 | 10/1976 | Starcevic | 310/91 |
| 4,145,626 | 3/1979 | Aroshidze et al. | 310/51 |
| 4,204,313 | 5/1980 | Kutoretsky et al. | 29/596 |
| 4,425,523 | 1/1984 | Detinko et al. | 310/258 |

FOREIGN PATENT DOCUMENTS

| | | | |
|---|---|---|---|
| 1189189 | 3/1965 | Fed. Rep. of Germany | 310/51 |
| 1065467 | 5/1954 | France | 310/258 |
| 56-101344 | 8/1981 | Japan. | |

*Primary Examiner*—J. D. Miller
*Assistant Examiner*—D. L. Rebsch
*Attorney, Agent, or Firm*—Sughrue, Mion, Zinn, Macpeak & Seas

[57] ABSTRACT

The magnetic circuit (6) of the stator is suspended from resilient suspension bars (26) which are welded both to floating stiffening rings (30) that are firmly mounted on the magnetic circuit, and to some of the stiffening rings (20) of the outer sheath (18). Other casing stiffening rings (22) have openings to allow the suspension bars to pass freely therethrough, and are equipped with stops to limit rotation of the stator in the event of an electrical fault. There are thus two paths for transmitting forces between the magnetic circuit and its surrounding sheath, one of which can be optimized for damping the vibrations of normal use, while the other can be optimized for avoiding damage under fault conditions.

6 Claims, 9 Drawing Figures

RESILIENTLY SUSPENDED STATOR FOR A DYNAMO-ELECTRICAL SYNCHRONOUS MACHINE

The present invention relates to the construction of stators for large synchronous electrical machines, and more particularly, to stators for turbo-alternators operating at high power, e.g. more than about 100 MW.

BACKGROUND OF THE INVENTION

Generally speaking, such a stator comprises:

a magnetic circuit constituted by an axial succession of rings made up of magnetic laminations and disposed co-axially about said longitudinal axis;

conductor windings extending axially in grooves made in the inside cylindrical surface of the magnetic circuit;

assembly rods spaced angularly around and extending longitudinally along the cylindrical outside surface of the magnetic circuit, with a radially inner portion of each rod being dove-tailed into each ring of the magnetic circuit;

axial tightening means for axially tightening the magnetic circuit;

a casing disposed coaxially about the stator outside the magnetic circuit, said casing comprising an outer cylindrical sheath with annular stiffening rings axially spaced along the inside of the sheath and welded thereto; and legs for fixing the casing to a support structure external to the stator.

In normal operation, the magnetic circuit of the stator in a large electrical machine is deformed by the forces which are induced by the magnetic field of the rotor. Each point on the outer cylindrical surface of the magnetic circuit moves synchronously with the rotation of the rotor, with a motion which is the resultant of a radial oscillation and a tangential oscillation. More precisely, each point moves substantially around an ellipse whose long axis is the amplitude of the radial component and whose short axis is the amplitude of the tangential component.

If these oscillations are transmitted undamped to the stator casing and hence to its foundations, they give rise to noise and to fatigue failures in the connecting parts subjected to the oscillations.

It is thus common practice to suspend the stator magnetic circuit from resilient means which provide the mechanical connection between the stator and the foundations on which the alternator is built, and which also provide effective damping of the vibration generated by large electrical machines before transmitting damped vibrations to the casing and thence to the foundations.

In a first known type of resilient suspension, the magnetic circuit is mounted in an inner casing or corset which is generally cylindrical in shape, and the resilient members are fixed along two or three generator lines of the corset (e.g. one on either side and one underneath). The resilient members are in the form of spring blades and they are positioned tangentially to the magnetic circuit and to the machine axis in such a manner as to provide a connection between the corset and the outer casing of the alternator.

This first known type has the drawbacks of requiring two casings to be constructed, which is costly and increases the bulk of the stator.

A second known type of resilient suspension includes blade springs extending axially between some of the assembly rods of the magnetic circuit and the stiffening rings of the casing. Each blade has axially separated fixing points therealong, fixing the spring alternately to the fixing rod and to the stiffening rings of the casing. The springs connect the magnetic circuit to the casing and damp the radial and tangential displacements of the magnetic circuit.

The spring blades are bunched in the most rigid zones of the casing, i.e. the zones which are least likely move because of elastic deformation of the casing. These zones are the zones which are closest to the legs for fixing the casing to an outside block of concrete.

This second type of known resilient suspension system is described in U.S. Pat. No. 4,145,626 (corresponding to French specification No. 2 376 542). The springs described are formed by having some of the assembly rods extend radially outwardly with slots dividing them over some portions of their length into inner portions which constitute a magnetic circuit assembly rod per se, and radially outer portions acting a spring blades. Such a system is relatively easy to manufacture, but it does not lend itself to obtaining adequate mechanical resiliance and damping of radial and tangential displacements.

Finally, in either of these known types of resilient suspension system, the system is subjected not only the vibrations due to normal operation, but also to loads and forces due to: the mass of the magnetic circuit and its windings; nominal operating torque; and, on occasion, the large torque which may be generated by an accidental electrical fault (short circuit, wrong coupling,). The need to be able to withstand all these forces and loads reliably makes such a system expensive to put into practice.

Further, U.S. Pat. No. 2,424,299 describes a stator for an electrical machine comprising: floating stiffening rings, fixed stiffening rings, assembly rods, and suspension rods shaped such that their central portions are radially resilient while being substantially stiff in the axial direction. However, the stiffening rings described do not include any means for limiting the kind of tangential displacement to be expected of the magnetic circuit in the event of an electrical short circuit for example, and therefore run the risk of damage to the mechanical and the electrical parts of the machine.

Preferred embodiments of the present invention provide simple and cheap means for resiliently suspending the stator of a synchronous dynamo-electrical machine, which means are capable of effectively damping vibrations due to normal operation without increasing the bulk of the stator and without running the risk of tangential displacement of the magnetic circuit in the event of a fault such as a short circuit across the machine's terminals.

SUMMARY OF THE INVENTION

The present invention provides a resiliently suspended stator for a dynamo-electrical synchronous machine, said stator having a longitudinal axis and comprising:

a magnetic circuit constituted by an axial succession of rings made up of magnetic laminations and disposed co-axially about said longitudinal axis;

conductor windings extending axially in grooves made in the inside cylindrical surface of the magnetic circuit;

assembly rods spaced angularly around and extending longitudinally along the cylindrical outside surface of the magnetic circuit, with a radially inner portion of each rod being dove-tailed into each ring of the magnetic circuit;

axial tightening means for axially tightening the magnetic circuit;

a casing disposed coaxially about the stator outside the magnetic circuit, said casing comprising an outer cylindrical sheath with annular stiffening rings axially spaced along the inside of the sheath and welded thereto;

legs for fixing the casing to a support structure external thereto;

resiliently flexible suspension rods extending parallel to the assembly rods and spaced angularly around the magnetic circuit outside the assembly rods, each suspension rod being provided with fixing points disposed at intervals therealong, with alternate fixing points being fixed to the magnetic circuit via the assembly rods and to the casing via its annular stiffening rings;

an axial succession of floating annular stiffening rings disposed coaxially around the magnetic circuit and located in between the stiffening rings of the casing thereby avoiding any increase in the outside dimensions of the stator, the inside edges of the floating stiffening rings being welded to the assembly rods so that the floating stiffening rings are deformed when the magnetic circuit deforms, the floating stiffening rings also being welded to the suspension rods, thereby constituting said fixing points between the suspension rods and the magnetic circuit;

the stiffening rings of the casing projecting radially inwardly past the suspension rods up to the vicinity of the assembly rods in such a manner as to ensure great rigidity;

the improvement wherein:

at least some of the stiffening rings of the casing are provided with respective cylindrical reinforcing flanges which are coaxial with the stator and which are welded to the inside edges of said rings, each flange being fitted with a plurality of pairs of rotation-limiting stops angularly spaced around the magnetic circuit with the stops of each pair being located on either side of a corresponding assembly rod in such a manner as to limit the extent to which the magnetic circuit can accidentally rotate in either direction due to an electrical fault, thereby putting a limit on the angular displacement which the flexible suspension rods need to be able to withstand under fault conditions.

The assembly rods act as key pins made fast to a plurality of floating stiffening rings and are deformed with the magnetic circuit in such a manner that the floating rings transmit the loads and forces in normal operation to the suspension bars which constitute axial springs. These springs are preferably arranged to present different stiffnesses in the radial and the tangential directions, and they are preferably bunched in the vicinity of the stiffest portions of the outer casing, i.e. close to the points where the legs are attached thereto.

The system of stops to limit the tangential movement of the magnetic circuit in the event of a short circuit at the terminals of the machine bears directly on the assembly rods and transmits forces directly to the casing and thence to the supporting concrete foundations, bypassing the suspension rods.

A system designed in this manner can serve both to damp vibrations and hence noise during normal operation, and also to avoid damage under fault conditions.

BRIEF DESCRIPTION OF THE DRAWINGS

An embodiment of the invention is described by way of example with reference to the acompanying drawings, in which.

Where the same items appear in more than one of the figures, they have the same reference numerals in all of them.

MORE DETAILED DESCRIPTION

The stator described by way of example is the stator of an alternator in a turbo-alternator set. Typically it will generate 600 MW of electricity, have a casing which is 4 m (meters) in diameter and an overall outside length in the range 6 to 9 m.

Figure 1:
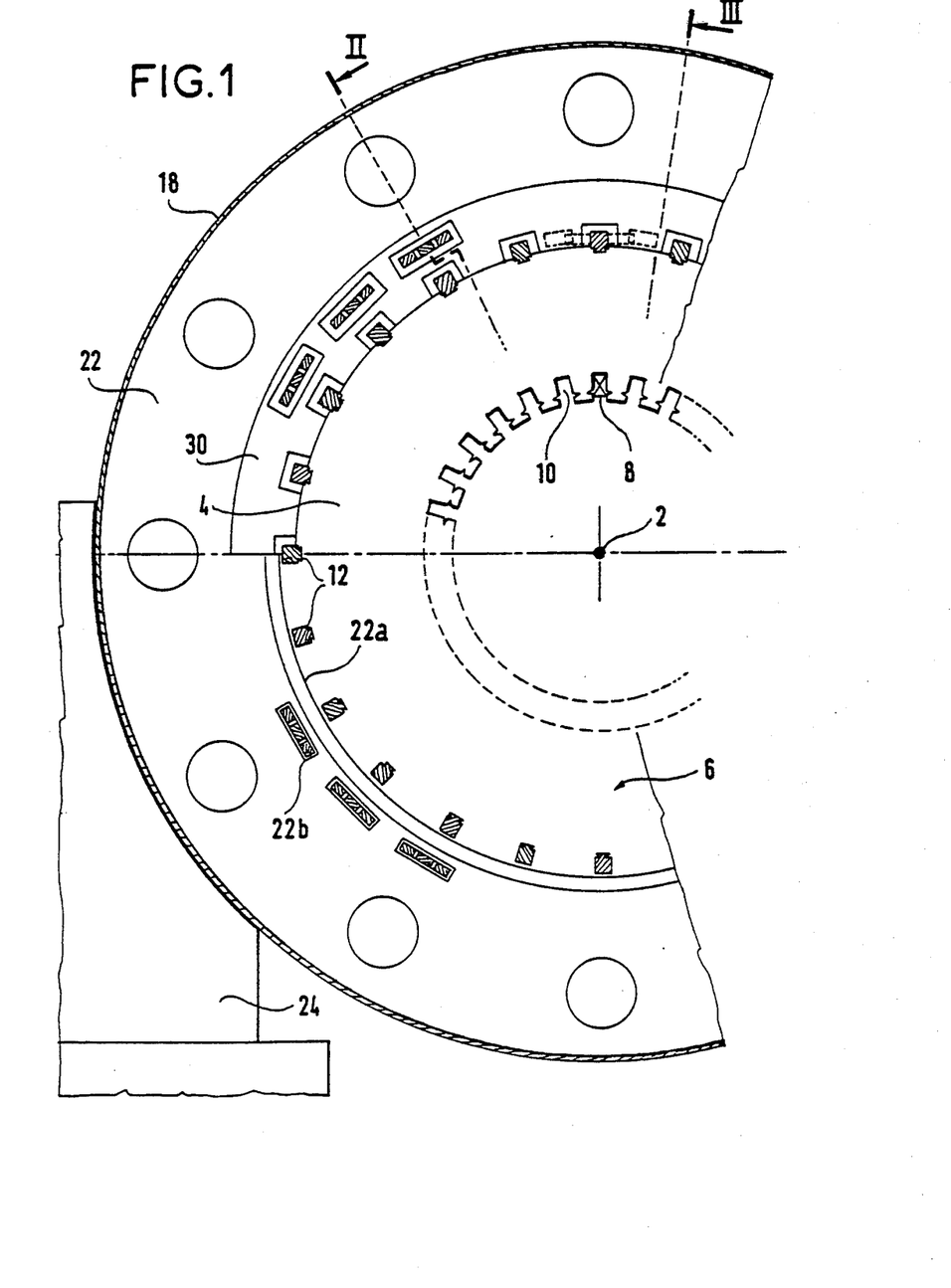
FIG. 1 shows two cross sections of a stator in accordance with the invention along lines AA and BB in FIG. 2, with the top of FIG. 1 corresponding to AA and the bottom to BB.
Figure 2:
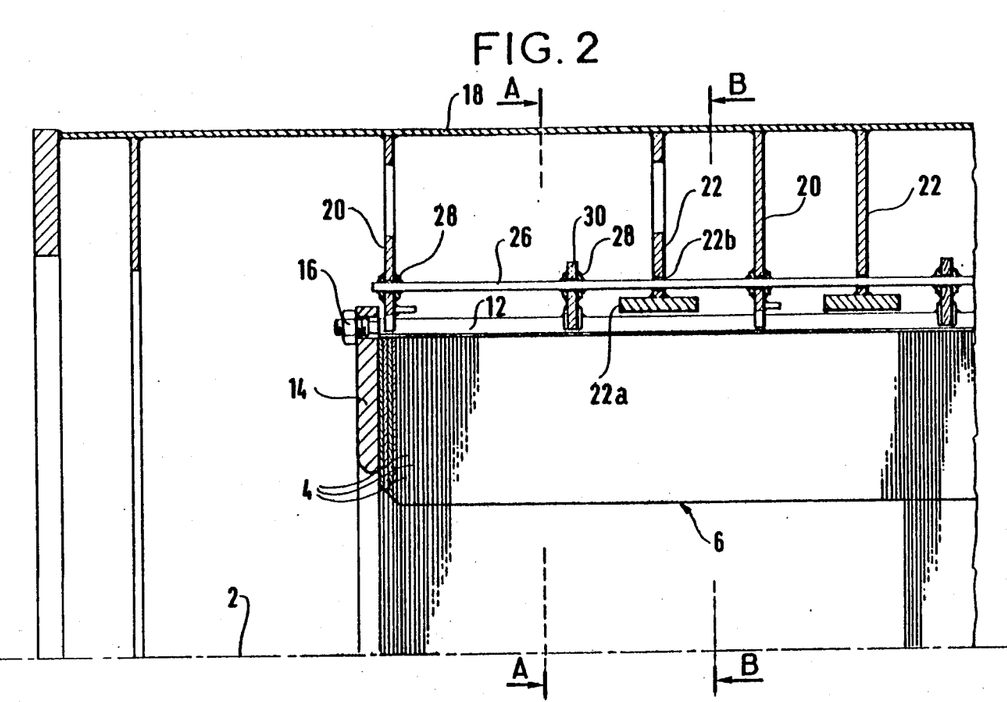
FIGS. 2 and 3 are two axial sections through the stator along lines II and III respectively in FIG. 1.
Figure 3:
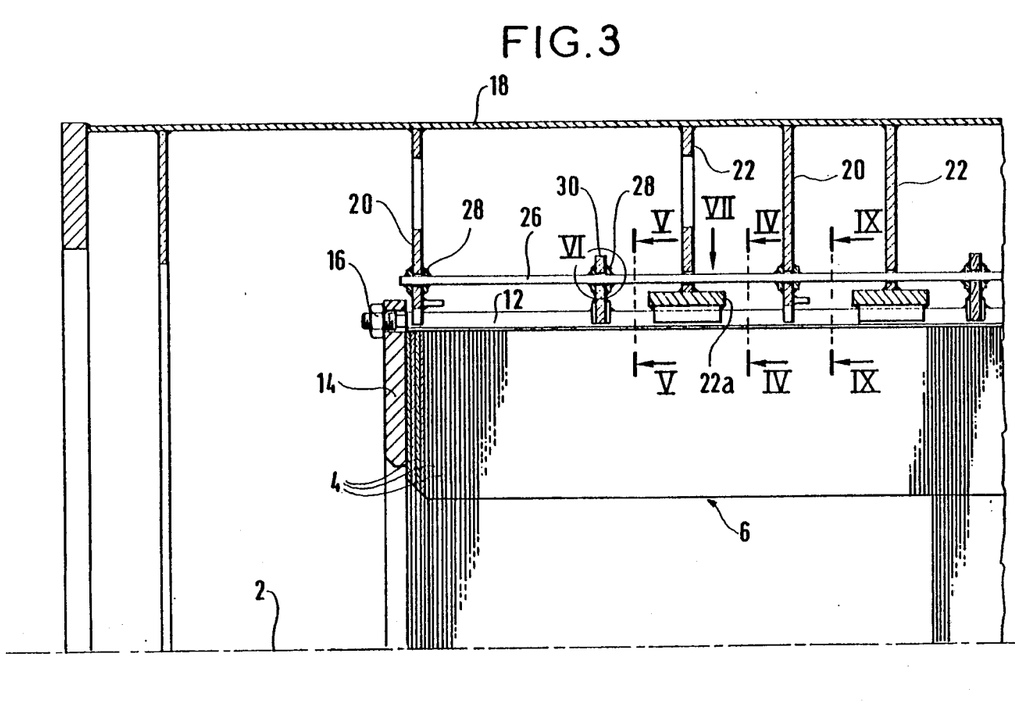
Figure 4:
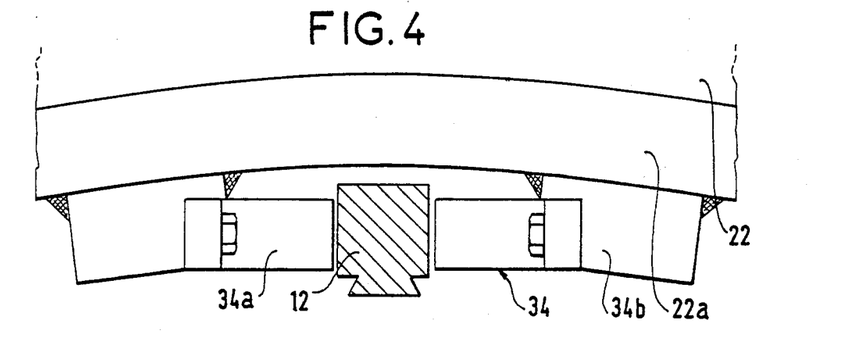
FIGS. 4 and 5 are cross sections on a larger scale along lines IV—IV and V—V respectively in FIG. 3 showing a pair of stops and the manner in which an assembly rod is fixed to a floating stiffening ring.
Figure 5:
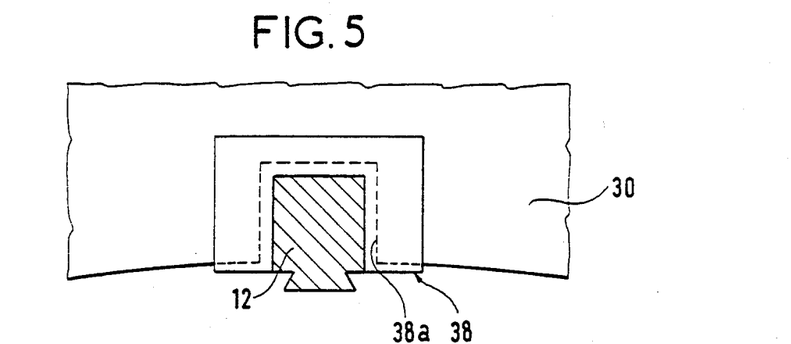

The stator is disposed co-axially about a longitudinal alternator axis 2. It includes the following well known components:

a magnetic circuit 6 constituted by an axial succession of rings made up of magnetic laminations and disposed co-axially about the axis 2;

conductor windings 8 extending axially in grooves 10 made in the inside cylindrical surface of the magnetic circuit 6;

assembly rods 12 spaced angularly around and extending longitudinally along the cylindrical outside surface of the magnetic circuit, with a radially inner portion of each rod being dove-tailed into each ring of the magnetic circuit;

axial tightening means 14 and 16 (FIG. 2) for axially tightening the magnetic circuit;

a casing disposed coaxially about the stator outside the magnetic circuit, said casing comprising an outer cylindrical sheath 18 with annular stiffening rings 20 and 22 axially spaced along the inside of the sheath and welded thereto; and legs 24 for fixing the casing to a support structure external thereto.

The axial tightening means comprise end plates 14 at each end of the magnetic circuit 6, and nuts 16 screwed onto threaded end portions of the assembly rods 12 to draw the end plates 14 towards each other. Tie rods (not shown) may be provided in addition. The support structure is constituted by blocks of reinforced concrete, not shown.

The stator further includes a resilient suspension system for suspending the magnetic circuit and for damping the vibrations transmitted to the casing.

The resilient system comprises resiliently flexible suspension rods 26 extending parallel to the assembly rods 12 and spaced angularly around the magnetic circuit 6 outside the assembly rods 12. Fixing points 28 are disposed at intervals along the suspension rods 26 and alternate fixing points are fixed to the magnetic circuit 6 via the assemly rods 12 and to the casing 18 via some of its annular stiffening rings 20. The suspension rods 26 are not fixed to the remaining casing stiffening rings 22, as explained below.

The stator also includes a succession of floating annular stiffening rings 30 disposed coaxially around the magnetic circuit and located between the stiffening rings 20 and 22 of the casing, thereby avoiding any increase in the outside dimensions of the stator. The inside edges of the floating stiffening rings 30 are welded to the assembly rods 12 so that they are deformed when the magnetic circuit deforms, and the rings 30 are also welded to the suspension rods 26, thereby constituting said fixing points between the suspension rods and the magnetic circuit.

The stiffening rings 20, 22 of the casing project radially inwardly past the suspension rods up to the vicinity of the assembly rods in such a manner as to ensure great rigidity.

Each suspension rod extends a little way beyond each end of the magnetic circuit 6.

As shown, each suspension rod 26 is made from a single bar of steel pierced in between fixing points by longitudinally extending slots 32 which divide the steel bar up into parallel portions 26a, 26b and 26c, thereby increasing its flexibility. The bar is not slotted in the immediate vicinity of the fixing points in order to facilitate fixing.

The tangential width of the suspension rod portions is greater than their radial thickness so that they flex radially more easily than they flex tangentially.

The tangential width, the radial thickness, and the axial distance between fixing points are calculated to optimize vibration damping.

The stiffening rings 22 of the casing are provided with cylindrical reinforcing flanges 22a which are coaxial with the stator and which are welded to the inside edges of the rings 22. Each flange is fitted with a plurality of pairs of stops 34 and 34a for limiting rotation. The stops are angularly spaced around the magnetic circuit in pairs on either side of a corresponding assembly rod 12 in such a manner as to limit the extent to which the magnetic circuit 6 can accidentally rotate in either direction due to an electrical fault, thereby putting a limit on the angular displacement which the flexible suspension rods 26 need to be able to withstand under fault conditions.

The stiffening rings 22 which are fitted with rotation-limiting stops 34 and 34a have slots 22b through which the suspension rods 26 pass without being fixed thereto and which are sufficiently large to avoid contact between the stiffening rings 22 and the suspension rods 26, even when deformations of the magnetic circuit are bending the suspension rods. This combination of two types of stiffening ring 20 and 22 thus serves to provide first and second paths having different dynamic characteristics for transmitting forces between the assembly rods 12 and the outer sheath 18: the first path is used for damping vibrations and comprises the floating stiffening rings 30, the suspension rods 26 and those stiffening rings 20 which are welded to the suspension rods 26; while the second path is used for transmitting extra forces created under fault conditions and comprises the rotation limiting stops 34 and 34a and those stiffening rings 22 which are fitted with said stops.

The stator axis is usually horizontal as shown. In which case the casing's legs 24 are then welded to the sides of the outer sheath 18, and the suspension rods 26 should be bunched near the sides of the stator so as to transmit forces to those parts of the casing which are most rigidly held by the legs 24, while the rotation-limiting stops 34 and 34a should be bunched in the upper and the lower portions of the stator.

More precisely, in the example shown, the pairs of stops are disposed on either side of the top and bottom assembly rods 12 which lie in the same vertical plane as the axis 2 and along the entire length thereof. This disposition enables the stops to be correctly assembled with predefined play while the machine is being assembled with its axis 2 vertical for stacking the laminations 4. It is only the top and bottom assembly rods 12 which do not undergo some degree of tangential movement when the machine is laid in its working position with its axis 2 horizontal.

Each of the stops 34 or 34a comprises a block of metal alloy having a low Young's modulus so that the energy of a collision is dissipated over a short displacement without excessively straining the welds by which a block-supporting shoe 34b is fastened to its flange 22a. The blocks 34 and 34a are bolted to their supporting shoes.

The play between the stops and the assembly rods 12 is adjusted during assembly. The shoe blocks may be made of an alloy known as AU4G1. The size and number of stops is calculated as a function of the energy to be absorbed under fault conditions, which energy is specific to each type of machine.

The suspension rods 26 pass with play through openings 28a both in the floating stiffening rings 30 and in those casing stiffening rings 20 to which the rods 26 are fixed. The openings 28a through the floating stiffening rings 30 pass through the outer portions thereof, while the openings 28a through the casing stiffening rings 20 pass through the inner portions thereof. In both cases the suspension rods 26 are fixed to the stiffening rings indirectly by being welded to connection plates 28 which have openings 28b through which the rods pass, and to which the rods are welded. The outside rims of the connection plates 28 are in turn welded to the stiffening rings. One of the purposes of such indirect fixing via outsized openings 28a is to enable the one piece rectangular section suspension rods 26 to be threaded into place along the entire length of the machine. Welding can then always be performed between pairs of parts which are at much closer tolerances to each other than would be practicable if the suspension bars had to be threaded through openings to which they were to be welded directly.

Figure 6:
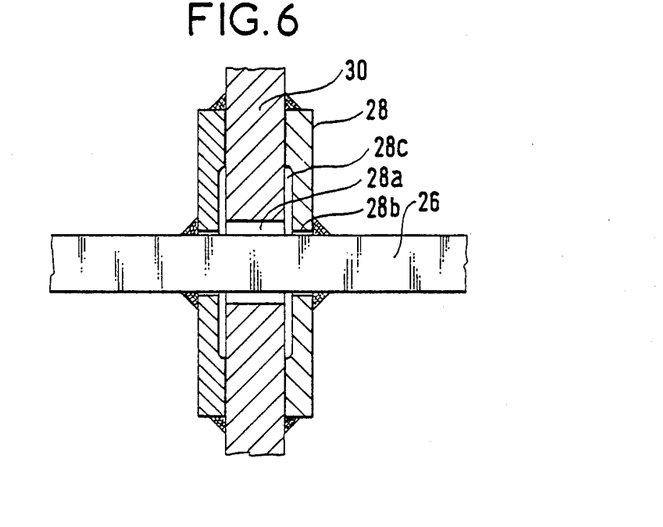
FIG. 6 is a detail VI of FIG. 3 on a larger scale showing how a suspension rod is fixed to a fixed or to a floating stiffening ring.
Figure 7:
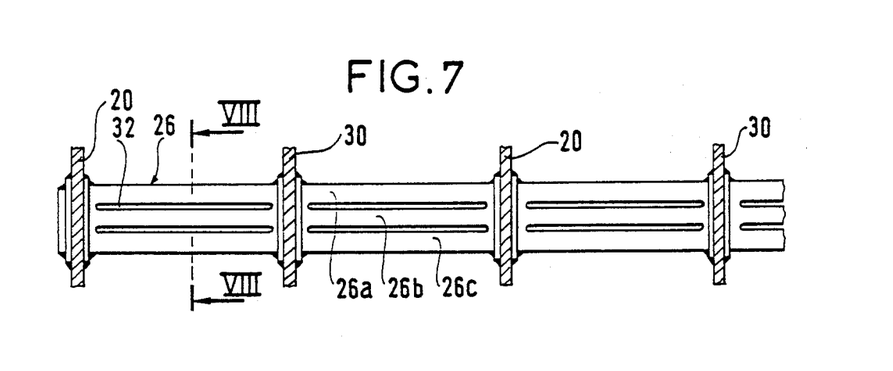
FIG. 7 shows a suspension rod as seen looking along a radial line VII in FIG. 3 and to a larger scale.
Figure 8:
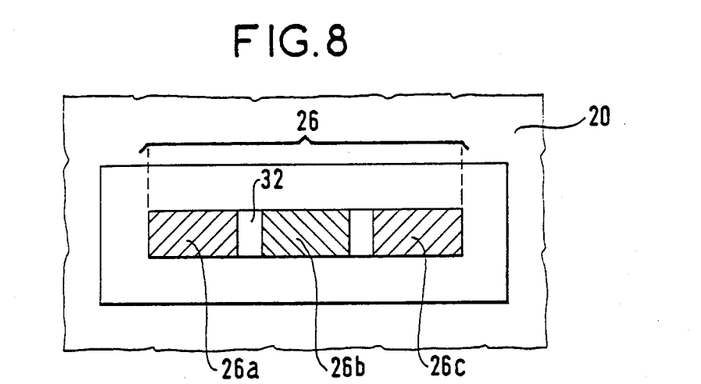
FIG. 8 is a cross section on an even larger scale through a suspension rod in a plane VIII—VIII in FIG. 7.
Figure 9:
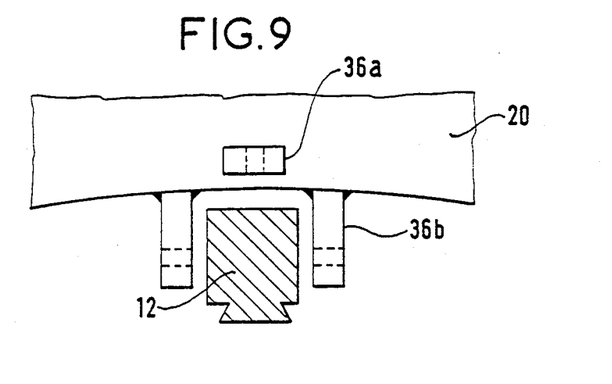
FIG. 9 is a cross section in a plane IX—IX in FIG. 3, to a larger scale, showing how lugs are disposed for adjusting the position of the suspension rods.

The connection plates 28 may stand off a little from the stiffening rings 20 leaving play 28c so as to enable the connection plates and the assembly as a whole to bend somewhat without running the danger of breaking the welds. This arrangement is shown in FIG. 6. There are occasions when it is the preferred form of fixing.

In a preferred disposition, at least some of the casing stiffening rings 20 are provided with adjusting lugs 36a and 36b respectively projecting axially and inwardly from the inner edges of the rings 20. The lugs have tapped holes running through them and are placed on three sides of the assembly rods 12 in such a manner that screws can be used temporarily to grip the assembly rods 12 while the stator is itself being assembled, thereby ensuring correct radial and tangential positioning of the assembly rods 12. The assembly rods 12 pass through notches 38a in the inside edges of the floating stiffening rings 30. The notches are a loose fit around the rods, and the rods are fixed to the floating rings by means of connection plates 38 which receive the rods in notches that are a close enough fit to be welded thereto and which overlap the notches 38a in the floating rings 30 for welding thereto around their outside edges. This enables the assembly rods to be welded to the floating rings after the positions of the rods have been adjusted relative to the rings 20.

The various connection plates mentioned above are used in pairs, one on either side of the ring to which a bar is being fixed.

The suspension rods may not have longitudinal slots 32 in some designs of stator which allow only the relatively low stresses to be applied to the welds connecting the suspension rods to the casing and to the magnetic circuit.

Several parameters will vary depending on the power of the machine being constructed:

there may be as few as 2 or as many as 5 or more floating rings;

there may be as few as 3 or as many as 6 or more fixing points between each suspension rod and casing stiffening rings;

the number of suspension rods and their cross section will also vary from one machine to another.

Well chosen values for the above parameters enable a good compromise to be obtained between the requirements for transmitting forces to the casing and those for damping vibrations.

Since the floating stiffening rings are rigidly connected to the magnetic circuit they follow all of its deformations and thus transmit all the loads and forces induced by normal operation to the resilient system. These loads and forces are transmitted to the suspension rods via the fixing points 28 i.e. via the welds around the openings 28a through the floating stiffening rings).

We claim:

1. A resiliently suspended stator for a dynamo-electrical synchronous machine, said stator having a longitudinal axis and comprising:

a magnetic circuit constituted by an axial succession of rings made up of magnetic laminations and disposed co-axially about said longitudinal axis;

conductor windings extending axially in grooves made in the inside cylindrical surface of the magnetic circuit;

assembly rods spaced angularly around and extending longitudinally along the cylindrical outside surface of the magnetic circuit, with a radially inner portion of each rod being dove-tailed into each ring of the magnetic circuit;

axial tightening means for axially tightening the magnetic circuit;

a casing disposed coaxially about the stator outside the magnetic circuit, said casing comprising an outer cylindrical sheath with annular stiffening rings axially spaced along the inside of the sheath and welded thereto;

legs fixing the casing to a support structure external thereto;

resiliently flexible suspension rods extending parallel to the assembly rods and spaced angularly around the magnetic circuit outside the assembly rods, each suspension rod being provided with fixing points disposed at intervals therealong, with alternate fixing points being fixed to the magnetic circuit via the assembly rods and to the casing via its annular stiffening rings;

an axial succession of floating annular stiffening rings disposed coaxially around the magnetic circuit and located between the stiffening rings of the casing thereby avoiding any increase in the outside dimensions of the stator, the floating stiffening rings having inside edges welded to the assembly rods so that the floating stiffening rings are deformed when the magnetic circuit deforms, the floating stiffening rings also being welded to the suspension rods, thereby constituting said fixing points between the suspension rods and the magnetic circuit;

the stiffening rings of the casing projecting radially inwardly past the suspension rods up to the vicinity of the assembly rods in such a manner as to ensure great rigidity;

the improvement wherein:

at least some of the stiffening rings of the casing are provided with respective cylindrical reinforcing flanges which are coaxial with the stator and which are welded to the inside edges of said rings, each flange being fitted with a plurality of pairs of rotation-limiting stops angularly spaced around the magnetic circuit with the stops of each pair being located on respective sides of a corresponding assembly rod in such a manner as to limit the extent to which the magnetic circuit can accidentally rotate in either direction due to an electrical fault, thereby putting a limit on the angular displacement which the flexible suspension rods need to be able to withstand under fault conditions;

and wherein the stiffening rings fitted the rotation-limiting stops, have slots through which the suspension rods pass without being fixed thereto and which are sufficiently large to avoid contact between said stiffening rings and the suspension rods, even when deformations of the magnetic circuit are bending the suspension rods, and wherein other ones of the casing stiffening rings are welded to the suspension rods to constitute said fixing points between the suspension rods and casing stiffening rings; thereby providing first and second paths with different dynamic chracteristics for transmitting forces between the assembly rods and the outer sheath: the first of said paths damping vibrations and comprising the floating stiffening rings, the suspension rods and those of the casing stiffening rings which are welded to the suspension rods; and the second of said paths transmitting extra forces created under fault conditions and comprising the rotation limiting stops and those of the casing stiffening rings which are fitted with said stops.

2. A stator according to claim 1, wherein the longitudinal axis is horizontal, wherein the casing fixing legs comprise stator fixing legs welded to either side thereof, and wherein the suspension rods are bunched near the sides of the stator so as to transmit forces to those parts of the casing which are most rigidly held by the legs, while the rotation-limiting stops are bunched in the upper and the lower portions of the stator.

3. A stator according to claim 1, wherein connection plates having openings through which the suspension rods also pass fix said rods to said stiffening rings, said rods being welded to the connection plates around the openings therethrough, and the connection plates being welded to the stiffening rings around their peripheries, play being left between the non-peripheral portions of the connection plates and the stiffening rings to which they are welded in such a manner as to enable the plates and the assembly to bend without breaking the welds.

4. A stator according to claim 1, wherein at least some of the casing stiffening rings are provided with adjusting lugs projecting from the inner edges thereof, said lugs having tapped holes running through them to receive temporary adjustment screws, and being placed around three sides of the assembly rods in such a manner that said screws can be used to grip the assembly rods while the stator is itself being assembled, wherein the assembly rods pass through notches in the inside edges of the floating stiffening rings in a loose fit around the rods, and connection plates recieving the rods and overlapping the notches in the floating stiffening rings, and wherein the rods are fixed to the floating rings; whereby the assembly rods may be welded to the floating rings after the positions of the rods have been adjusted relative thereto.

5. A resiliently suspended stator for a dynamo-electrical synchronous machine, said stator having a longitudinal axis and comprising:

a magnetic circuit consituted by an axial succession of rings made up of magnetic laminations and disposed coaxially about said longitudinal axis;

conductor windings extending axially in grooves made in the inside cylindrical surface of the magnetic circuit;

assembly rods spaced angularly around and extending longitudinally along the cylindrical outside surface of the magnetic circuit, with a radially inner portion of each rod being dove-tailed into each ring of the magnetic circuit;

axial tightening means for axially tightening the magnetic circuit;

a casing disposed coaxially about the stator outside the magnetic circuit, said casing comprising an outer cylindrical sheath with annular stiffening rings axially spaced along the inside of the sheath and welded thereto;

legs fixing the casing to a support struture external thereto;

resiliently flexible suspension rods extending parallel to the assembly rods and spaced angularly around the magnetic circuit outside the assembly rods, each suspension rod being provided with fixing points disposed at intervals therealong, with alternate fixing points being fixed to the magnetic circuit via the assembly rods and to the casing via its annular stiffening rings;

an axial succession of floating annular stiffening rings disposed coaxially around the magnetic circuit and located in between the stiffening rings of the casing thereby avoiding any increase in the outside dimensions of the stator, the floating stiffening rings having inside edges welded to the assembly rods so that the floating stiffening rings are deformed when the magnetic circuit deforms, the floating stiffening rings also being welded to the suspension rods, thereby constituting said fixing points between the suspension rods and the magnetic circuit;

the stiffening rings of the casing projecting radially inwardly past the suspension rods up to the vicinity of the assembly rods in such a manner as to ensure great rigidity:

the improvement wherein:

at least some of the stiffening rings of the casing are provided with respective cylindrical reinforcing flanges which are coaxial with the stator and which are welded to the inside edges of said rings, each flange being fitted with a plurality of pairs of rotation-limiting stops angularly spaced around the magnetic circuit with the stops of each pair being located on respective sides of a corresponding assembly rod in such a manner as to limit the extent to which the magnetic circuit can accidentally rotate in either direction due to an electrical fault, thereby putting a limit on the angular displacement which the flexible suspension rods need to be able to withstand under fault conditions;

and wherein each suspension rod is pierced by longitudinally extending slots dividing the rod into a plurality of portions extending side by side in parallel thereby increasing rod flexibility, said rod not being slotted in the immediate vicinity of the fixing points in order to facilitate fixing;

and wherein the suspension rods extend substantially along the entire length of the magnetic circuit.

6. A stator according to claim 5, wherein each suspension rod pierced portion has a tangential width which is greater than its radial thickness so that it flexes radially more easily than it flexes tangentially.

* * * * *